(12) United States Patent
Nakano

(10) Patent No.: US 11,985,274 B2
(45) Date of Patent: May 14, 2024

(54) IMAGE PROCESSING APPARATUS AND METHOD WHICH TRANSMITS IMAGE DATA TO AN EXTERNAL APPARATUS USING CODE INFORMATION

(71) Applicant: CANON KABUSHIKI KAISHA, Tokyo (JP)

(72) Inventor: Kyosuke Nakano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/180,524

(22) Filed: Mar. 8, 2023

(65) Prior Publication Data

US 2023/0300263 A1 Sep. 21, 2023

(30) Foreign Application Priority Data

Mar. 16, 2022 (JP) ................................. 2022-041324

(51) Int. Cl.
*H04N 1/00* (2006.01)
*G06F 21/31* (2013.01)
*H04N 1/32* (2006.01)

(52) U.S. Cl.
CPC ......... *H04N 1/00225* (2013.01); *G06F 21/31* (2013.01); *H04N 1/32128* (2013.01)

(58) Field of Classification Search
None
See application file for complete search history.

(56) References Cited

U.S. PATENT DOCUMENTS

| 2008/0068674 | A1* | 3/2008 | McIntyre | H04N 1/2038 358/474 |
| 2012/0140275 | A1* | 6/2012 | Fukuda | H04N 1/00228 358/1.15 |
| 2017/0272585 | A1* | 9/2017 | Nakahara | H04N 1/4413 |
| 2017/0353616 | A1* | 12/2017 | Hayashi | H04N 1/00944 |
| 2022/0124206 | A1* | 4/2022 | Matsunaka | H04N 1/00896 |
| 2022/0254159 | A1* | 8/2022 | Hara | G09B 7/02 |
| 2022/0254267 | A1* | 8/2022 | Hara | G06F 16/3329 |
| 2023/0012409 | A1* | 1/2023 | Maruyama | G09B 7/02 |

FOREIGN PATENT DOCUMENTS

| JP | 2015169971 A | * | 9/2015 |
| JP | 2015169971 A | | 9/2015 |

* cited by examiner

*Primary Examiner* — Henok Shiferaw
(74) *Attorney, Agent, or Firm* — Canon U.S.A., Inc., IP Division

(57) ABSTRACT

A control method for an image processing apparatus includes reading an original document, analyzing code information in image data generated by reading of the original document, acquiring authentication information for logging in to an external apparatus by analyzing the code information, logging in to the external apparatus using the acquired authentication information, and transmitting the image data to the external apparatus to which the logging in is performed.

10 Claims, 18 Drawing Sheets

FIG.13

1300
ASSIGNMENT PRINT/SUBMISSION

USER ID: xxxxx ~1301
SELECT CLASS. ~1302

1303
| CLASS 1 | |
| CLASS 2 | |
| CLASS 3 | |

1310
ASSIGNMENT PRINT/SUBMISSION

USER ID: xxxxx ~1311
CLASS: CLASS 1
SELECT STATUS. ~1312

1313
| ASSIGNED | |
| SUBMITTED | |
| GRADED | |

1320
ASSIGNMENT PRINT/SUBMISSION

USER ID: xxxxx ~1321
CLASS: CLASS 1 ~1322
STATUS: ASSIGNED ~1324
SELECT ASSIGNMENT YOU WANT TO PRINT. ~1325

1323
| ASSIGNMENT 1 | ASSIGNMENT 2 | ASSIGNMENT 3 |

IMAGE PROCESSING APPARATUS AND METHOD WHICH TRANSMITS IMAGE DATA TO AN EXTERNAL APPARATUS USING CODE INFORMATION

BACKGROUND

Field

The present disclosure relates to an image processing apparatus, a control method for the image processing apparatus which transmits image data to an external apparatus, and a storage medium.

Description of the Related Art

Conventionally, an education management system has been used in which a student receives an assignment created by a teacher from an external apparatus by operating an image processing apparatus, obtains a printed document by printing the received assignment, causes the image processing apparatus to read the printed document to which the student has added some writing, and submits the printed document to the teacher by uploading the document as image data through the system.

The teacher can grade the submitted assignments and send feedback to the students through the education management system, which facilitates the teacher's tasks of managing remote learning and the progress in learning by students.

Japanese Patent Application Laid-Open No. 2015-169971 discusses an image processing apparatus that performs user authentication on an external apparatus, prints assignment data on the external apparatus, and transits image data generated by reading a document to the external apparatus.

It takes some time for a student to work on an assignment after printing the assignment until the student submits the assignment.

If the authentication state between the image processing apparatus and the external apparatus is maintained during the time from printing to submission of the assignment as discussed in Japanese Patent Application Laid-Open No. 2015-169971, the image processing apparatus may keep occupying a session for communication on the external apparatus side.

On the other hand, in a case where the authentication state is not maintained, the user is required to input authentication information both at the time of printing the assignment and at the time of submitting the assignment, which is inconvenient.

SUMMARY

According to an aspect of the present disclosure, an image processing apparatus includes a reading unit configured to read an original document and generate image data representing the original document, an analysis unit configured to analyze code information in the generated image data representing the original document, an acquisition unit configured to acquire authentication information for logging into an external apparatus based on the analyzed code information, a login unit configured to log in to the external apparatus using the acquired authentication information, and a transmission unit configured to, upon logging into the external apparatus, transmit the generated image data to the external apparatus.

Further features of the present disclosure will become apparent from the following description of exemplary embodiments with reference to the attached drawings.

BRIEF DESCRIPTION OF THE DRAWINGS

FIG. 13 is a diagram illustrating examples of a screen related to the file location identification processing according to the first exemplary embodiment.

DESCRIPTION OF THE EMBODIMENTS

Exemplary embodiments of the present disclosure will be described below with reference to the drawings. The following exemplary embodiments are not intended to limit the present invention according to the scope of claims, and not all of combinations of features described in the exemplary embodiments are necessarily essential for solving the problems in the present disclosure.

A first exemplary embodiment of the present disclosure will be described.

Figure 1:
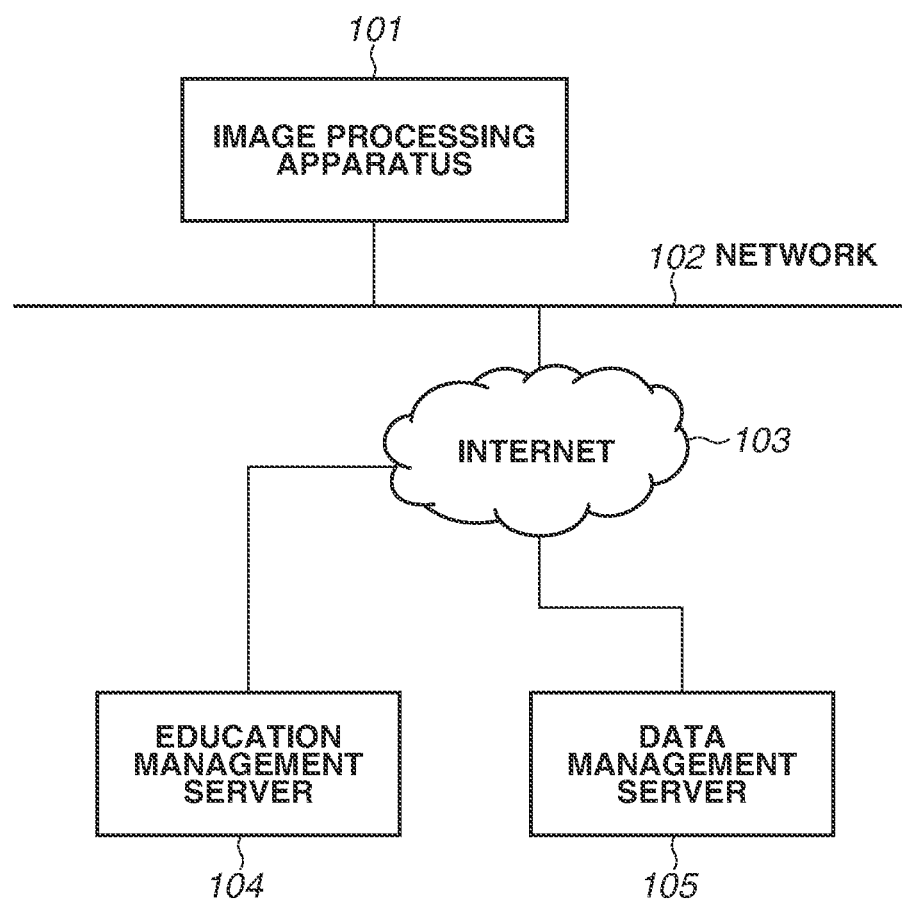
FIG. 1 is a diagram illustrating an example of a system configuration including an image processing apparatus according to a first exemplary embodiment.

FIG. 1 is a diagram illustrating a configuration of an image processing system including an image processing apparatus according to the present exemplary embodiment.

The image processing system in FIG. 1 includes an image processing apparatus 101, an education management server 104, and a data management server 105. The image processing apparatus 101 can communicate with the education management server 104 and the data management server 105 via a network 102 and the Internet 103. The education management server 104 can communicate with the data management server 105 via the Internet 103.

The image processing apparatus 101 has a transmission function to generate image data indicating an image of an original document by reading the original document, and transmit the generated image data. The image processing apparatus 101 further has a copy function to generate image data indicating an image of an original document by reading the original document, and perform printing based on the generated image data.

The network 102 may have a configuration of wirelessly connecting to an access point (not illustrated), if this is a network configuration in which image data can be transmitted. The image data in the present exemplary embodiment is electronic data. Specifically, the image data is not limited to electronic data obtained by converting an image into raw data, and may be electronic data in image format such as Tag Image File Format (TIFF) or Joint Photographic Experts Group (JPEG), or electronic data in Portable Document Format (PDF), i.e., the form of the electronic data is not limited in the present exemplary embodiment.

The education management server 104 is a server that can communicate with the image processing apparatus 101 via the network 102 and the Internet 103. The education management server 104 can also communicate with the data management server 105 via the Internet 103.

The data management server 105 is a server that can communicate with the image processing apparatus 101 via the network 102 and the Internet 103, and saves image data. The data management server 105 can also communicate with the education management server 104 via the Internet 103.

Figure 2:
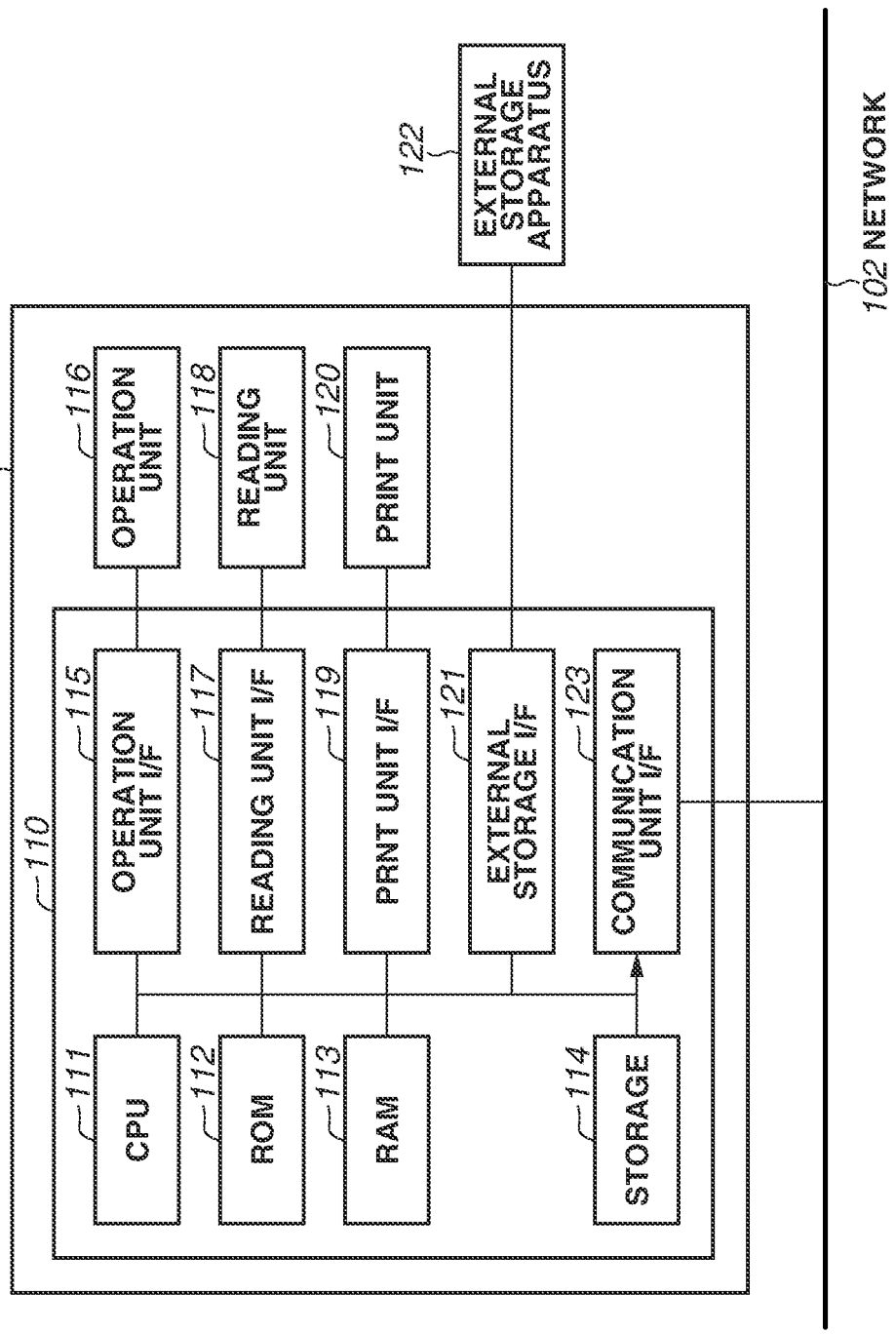
FIG. 2 is a diagram illustrating an example of a hardware configuration of the image processing apparatus according to the first exemplary embodiment.

FIG. 2 is a block diagram illustrating a configuration of the image processing apparatus 101. The image processing apparatus 101 will be hereinafter referred to as the multi-function peripheral (MFP) 101.

A control unit 110 including a central processing unit (CPU) 111 controls the operation of the entire MFP 101. The CPU 111 reads out a control program stored in a read only memory (ROM) 112 or a storage 114, and executes the control program, thereby performing various types of control such as reading control, print control, and communication control.

The ROM 112 stores a control program executable by the CPU 111.

The ROM 112 also stores a boot program, font data, and the like.

A random access memory (RAM) 113 is a main memory for the CPU 111, and is used as a work area, and is also used as a temporary storage area for loading various control programs stored in the ROM 112 and the storage 114.

The storage 114 stores image data, print data, an address book, shortcuts, various programs, and various kinds of setting information. In the present exemplary embodiment, a flash memory is used as the storage 114, but the storage 114 is not limited thereto, and an auxiliary storage device such as a solid state drive (SSD), a hard disk drive (HDD), or an embedded Multi Media Cart (eMMC) may be used.

In the MFP 101, a single CPU 111 executes each process in flowcharts to be described below, using one memory (the RAM 113), but other configuration may be adopted.

For example, a plurality of CPUs, RAMs, ROMs, and storages may cooperate to execute each process in the flowcharts to be described below. Further, part of the processes may be executed using a hardware circuit such as an application specific integrated circuit (ASIC) or a field-programmable gateway array (FPGA).

An operation unit interface (I/F) 115 connects an operation unit 116 and the control unit 110. The operation unit 116 includes a touch panel in which a touch panel sheet and a liquid crystal display portion are integrated, and hardware keys. The operation unit 116 displays information on the touch panel, and accepts inputs from a user via the touch panel or hardware keys.

A reading unit I/F 117 connects a reading unit 118 and the control unit 110. The reading unit 118 reads an image on an original document and converts the image into image data such as binary data. The image data generated by the reading unit 118 is transmitted to an external apparatus, stored in an external recording apparatus, or printed on print paper (a sheet).

A print unit I/F 119 connects a print unit 120 and the control unit 110. The CPU 111 transfers image data to be printed (print target image data) to the print unit 120 via the print unit I/F 119. The print unit 120 prints an image on print paper conveyed from a feeding cassette (not illustrated), using toner supplied from a cartridge (not illustrated).

An external storage I/F 121 connects an external storage apparatus 122 and the control unit 110. The CPU 111 stores image data into the external storage apparatus 122 via the external storage I/F 121. In the present exemplary embodiment, a Universal Serial Bus (USB) interface is used as the external storage I/F 121, and a USB memory is used as the external storage apparatus 122, but an external storage apparatus such as a secure digital (SD) card may be used.

The control unit 110 is connected to the network 102 by a communication unit I/F 123.

The communication unit I/F 123 connects to, performs authentication for, transmits image data to, and acquires data management information from the data management server 105 via the network 102 and the Internet 103.

Further, the communication unit I/F 123 connects to, performs authentication for, and transmits/receives various data to/from the education management server 104 via the network 102 and the Internet 103. Furthermore, the communication unit I/F 123 is connected to and can communicate with the data management server 105 via the network 102 and the Internet 103.

Figure 3:
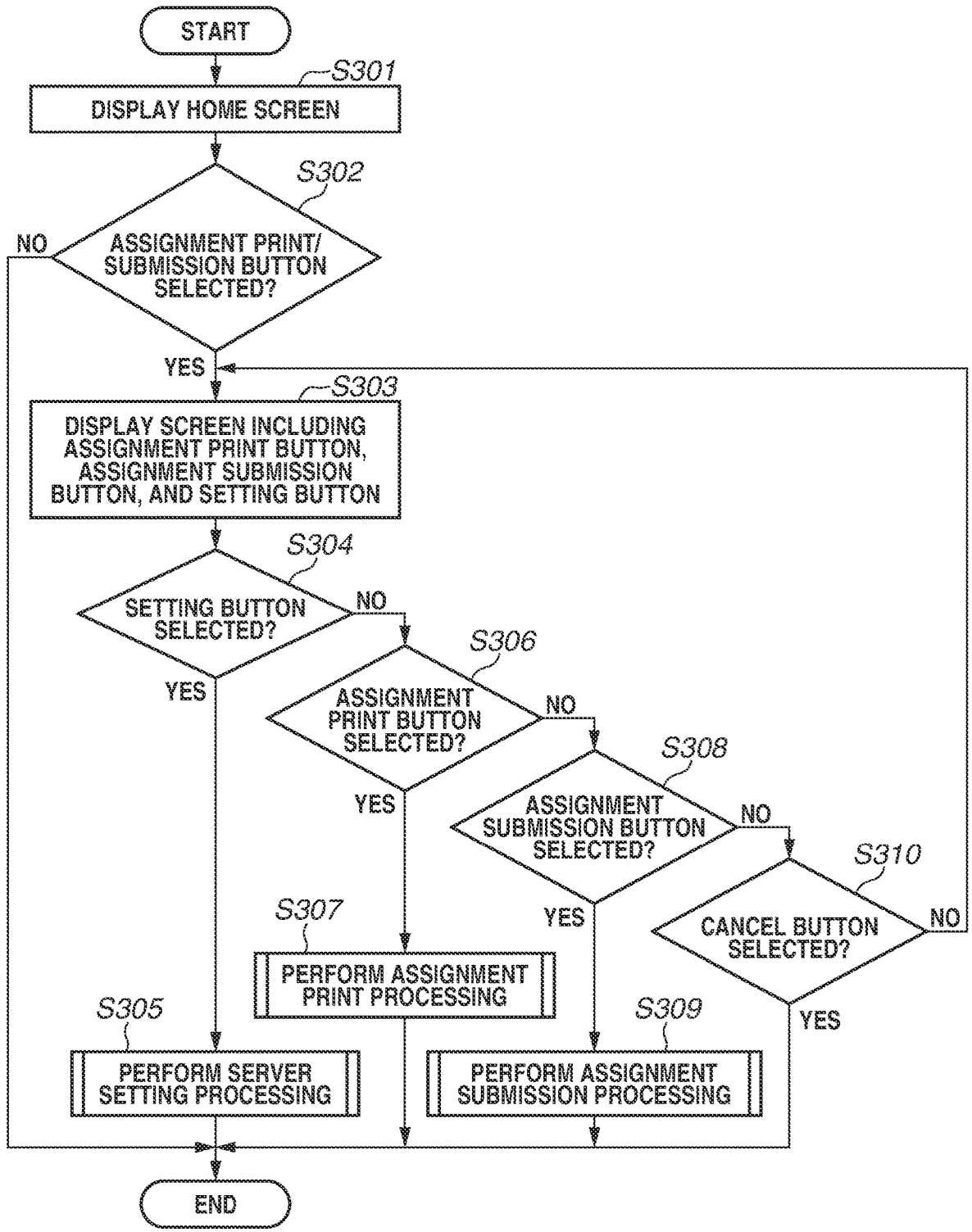
FIG. 3 is a flowchart illustrating overall processing in an assignment print/submission application according to the first exemplary embodiment.

FIG. 3 is a flowchart illustrating main processing in the present exemplary embodiment.

Before describing each step in the flowchart, an outline of the present flowchart will be described. Three types of processing: assignment print processing, assignment submission processing and server setting processing will be described with reference to the present flowchart. The assignment print processing and assignment submission processing are main processing of an assignment print/submission application, and the server setting processing is pre-setting processing for performing these two types of processing. These three types of processing are executed in the order of description below.

The processing to be performed first is the server setting processing. In the server setting processing, a server which the MFP 101 performs authentication for and logs in to is set. Details of the server setting processing will be described below with reference to FIG. 4.

The processing to be performed second is the assignment print processing. In the assignment print processing, the MFP 101 logs in to the education management server 104 set by the server setting processing using authentication information input by a user, and prints image data obtained by combining the authentication information and location information with assignment image data stored in the data management server 105 associated with the education management server 104. Details of the assignment print processing will be described with reference to FIG. 5. Addition of some writing to a print product in the assignment print processing by the user corresponds to answering to the assignment.

The processing to be performed third is the assignment submission processing. The sheet which is printed in the assignment print processing and the user adds some writing to is used here as an original document. The MFP 101 scans the original document, and acquires the authentication information and the location information combined with the image data obtained by the scan. The MFP 101 logs in to the education management server 104 using the acquired authentication information, and transmits the image data obtained by the scan and the location information to the data management server 105 associated with the education management server 104. Details of the assignment submission processing will be described with reference to FIG. 6. The transmission of the image data in the assignment submission processing corresponds to submission of an assignment sheet to which the user has added an answer.

The CPU 111 reads out a program stored in the ROM 112 or the storage 114 into the RAM 113, and executes the program, so that each step of the flowchart in FIG. 3 is implemented.

Figure 9:
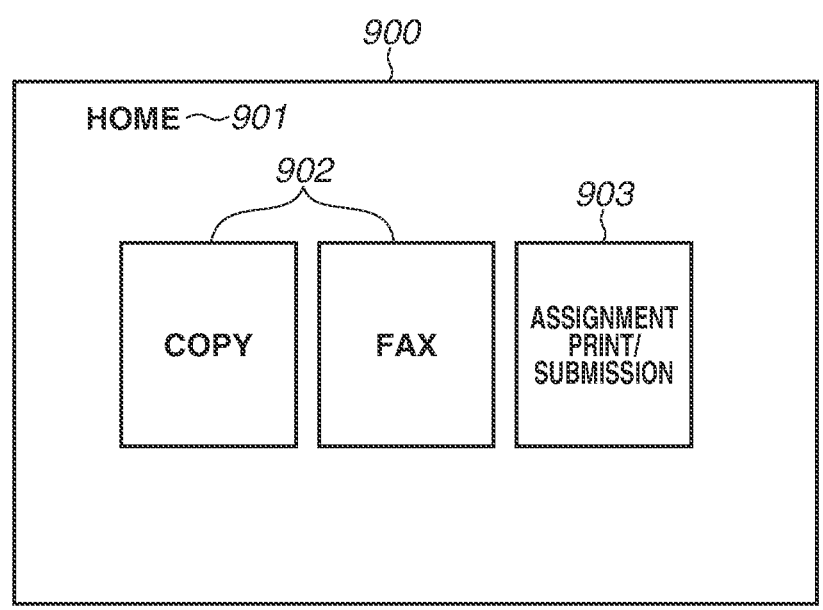
FIG. 9 is a diagram illustrating an example of a home screen including the assignment print/submission application according to the first exemplary embodiment.

In step S301, the CPU 111 displays a home screen illustrated in FIG. 9 on the operation unit 116. A screen 900 represents the home screen, and a display 901 is a display indicating that the screen 900 is the home screen. The home screen includes a button 903 corresponding to an application for performing a print function or submission function for an assignment in the present system, and buttons 902 corresponding to other functions or applications. Here, a copy button for using the copy function and a fax button for using the fax function are indicated as examples of the buttons 902.

In step S302, the CPU 111 determines whether the button 903 for the assignment print/submission application in the home screen in FIG. 9 displayed on the operation unit 116 is selected. In a case where the CPU 111 determines that the button 903 is selected (YES in step S302), the processing proceeds to step S303, and in a case where the CPU 111 determines that the button 903 is not selected (NO in step S302), the processing ends.

Figure 10:
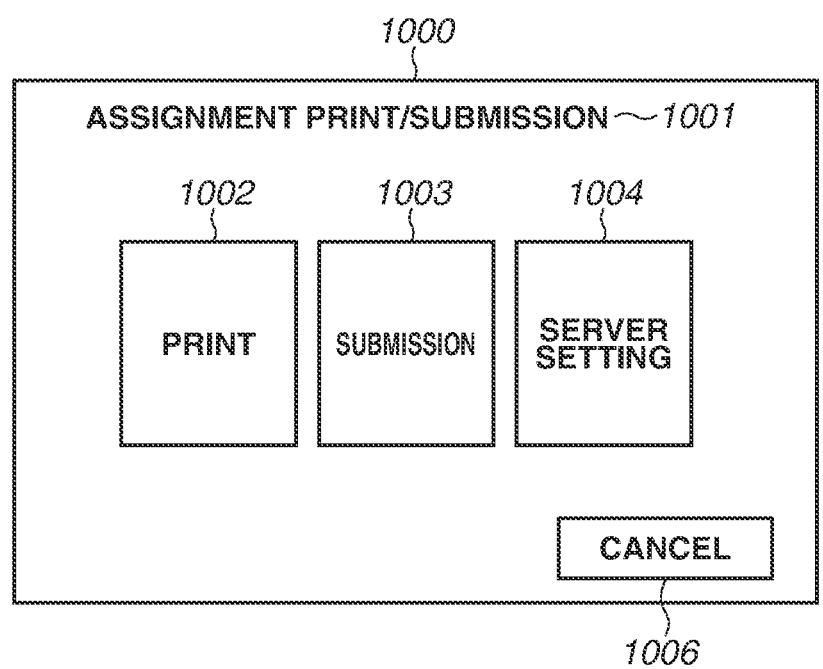
FIG. 10 is a diagram illustrating an example of a menu screen in the assignment print/submission application according to the first exemplary embodiment.

In step S303, the CPU 111 displays a menu screen in the assignment print/submission application illustrated in FIG. 10, on the operation unit 116. A screen 1000 in FIG. 10 is the menu screen in the assignment print/submission application. A display 1001 is a display indicating that the screen 1000 is the screen for the assignment print/submission application.

In step S304, the CPU 111 determines whether a setting button 1004 displayed on the operation unit 116 is selected. In a case where the CPU 111 determines that the setting button 1004 is selected (YES in step S304), the processing proceeds to step S305, and in a case where the CPU 111 determines that the setting button 1004 is not selected (NO in step S304), the processing proceeds to step S306.

In step S305, the CPU 111 performs the server setting processing to be described below with reference to FIG. 4.

In step S306, the CPU 111 determines whether an assignment print button 1002 displayed on the operation unit 116 is selected. In a case where the CPU 111 determines that the assignment print button 1002 is selected (YES in step S306), the processing proceeds to step S307, and in a case where the CPU 111 determines that the assignment print button 1002 is not selected (NO in step S306), the processing proceeds to step S308.

In step S307, the CPU 111 performs the assignment print processing to be described below with reference to FIG. 5.

In step S308, the CPU 111 determines whether an assignment submission button 1003 displayed on the operation unit 116 is selected. In a case where the CPU 111 determines that the assignment submission button 1003 is selected (YES in step S308), the processing proceeds to step S309, and in a case where the CPU 111 determines that the assignment submission button 1003 is not selected (NO in step S308), the processing proceeds to step S310.

In step S309, the CPU 111 performs the assignment submission processing to be described below with reference to FIG. 6.

In step S310, the CPU 111 determines whether a cancel button 1006 displayed on the operation unit 116 is selected. In a case where the CPU 111 determines that the cancel button 1006 is selected (YES in step S310), the processing ends, and in a case where the CPU 111 determines that the cancel button 1006 is selected the cancel button 1006 is not selected (NO in step S310), the processing returns to step S303.

Figure 4:
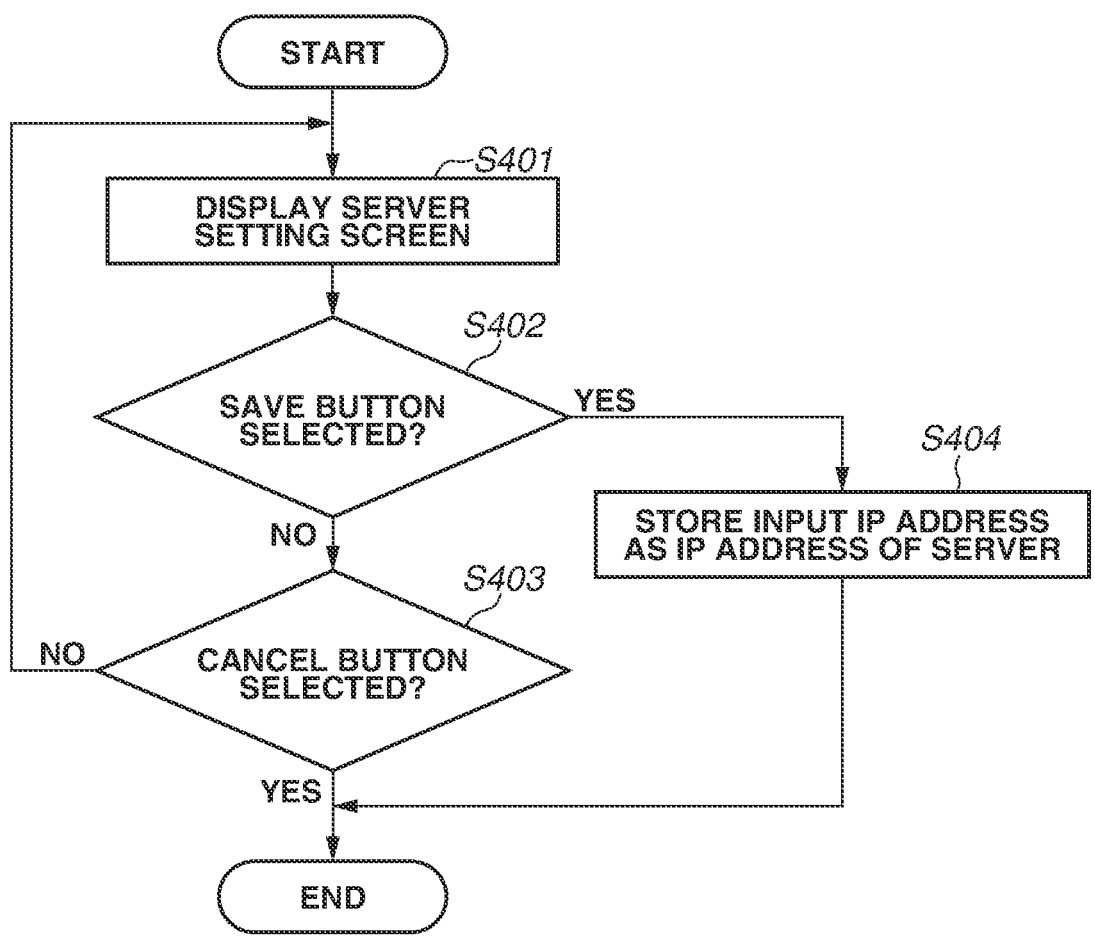
FIG. 4 is a flowchart illustrating server setting processing according to the first exemplary embodiment.

FIG. 4 is a flowchart illustrating the server setting processing in the present system. The CPU 111 reads out a program stored in the ROM 112 or the storage 114 into the RAM 113, and executes the program, so that each step of the flowchart in FIG. 4 is implemented.

Figure 11:
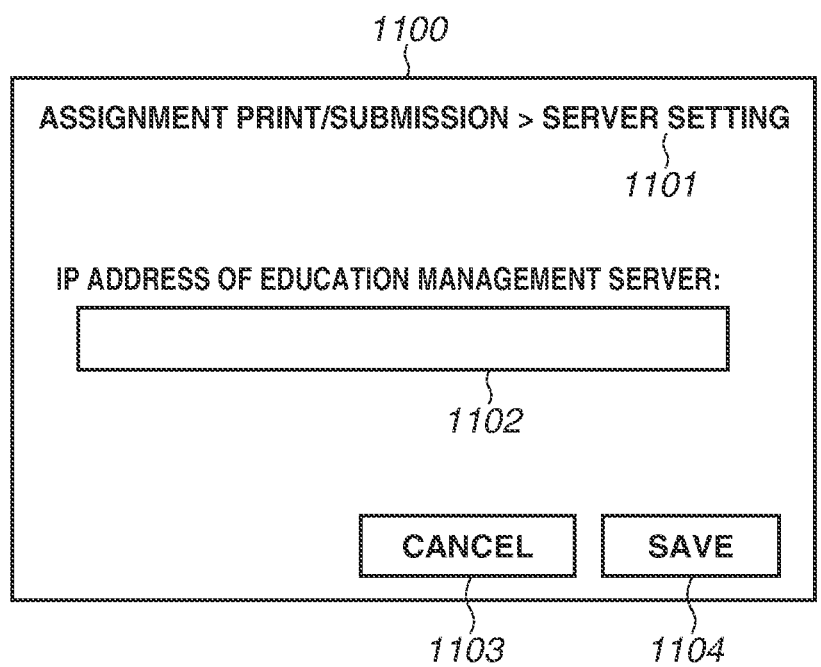
FIG. 11 is a diagram illustrating an example of a server setting screen according to the first exemplary embodiment.

In step S401, the CPU 111 displays a server setting screen 1100 illustrated in FIG. 11 on the operation unit 116. A display 1101 in FIG. 11 indicates that this screen is a screen for the server setting processing in the assignment print/submission application. The user can input an Internet Protocol (IP) address by selecting an IP address input field 1102 for inputting an IP address of the education management server 104, using the operation unit 116.

In step S402, the CPU 111 determines whether a save button 1104 displayed on the operation unit 116 is selected. In a case where the CPU 111 determines that the save button 1104 is selected (YES in step S402), the processing proceeds to step S404, and in a case where the CPU 111 determines that the save button 1104 is not selected (NO in step S402), the processing proceeds to step S403.

In step S403, the CPU 111 determines whether a cancel button 1103 displayed on the operation unit 116 is selected. In a case where the CPU 111 determines that the cancel button 1103 is selected (YES in step S403), the processing ends, and in a case where the CPU 111 determines that the cancel button 1103 is not selected (NO in step S403), the processing returns to step S401.

In step S404, the CPU 111 stores the IP address input in the IP address input field 1102 for inputting the IP address of the education management server 104, into the RAM 113. The IP address stored here is used as the IP address of the education management server 104 in the assignment print processing to be described below with reference to FIG. 5. In the present exemplary embodiment, inputting the IP address is described as a way of designating the education management server 104, but the way of designating the education management server 104 is not limited thereto, and any method can be employed as long as the education management server 104 can be identified by the method.

Figure 5:
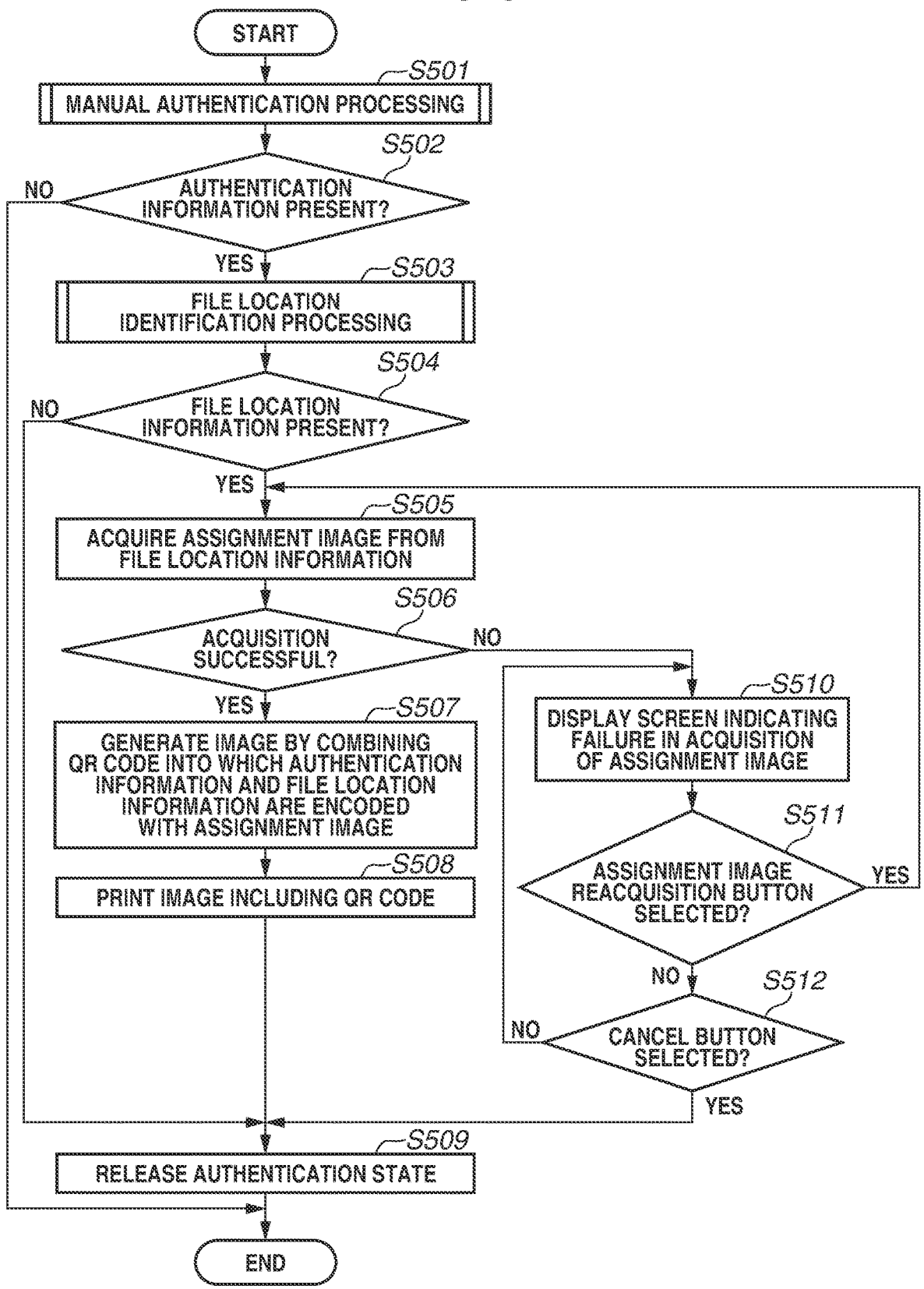
FIG. 5 is a flowchart illustrating assignment print processing according to the first exemplary embodiment.

FIG. 5 is a flowchart illustrating the assignment print processing in the present system. The CPU 111 reads out a program stored in the ROM 112 or the storage 114 into the RAM 113, and executes the program, so that each step of the flowchart in FIG. 5 is implemented.

In step S501, the CPU 111 executes manual authentication processing to be described with reference to FIG. 7. In the manual authentication processing, the user logs in to the education management server 104, using authentication information input via the operation unit 116.

In step S502, the CPU 111 determines whether the authentication information is stored in the RAM 113. In a case where the authentication information is stored (YES in step S502), the processing proceeds to step S503, and in a case where the authentication information is not stored (NO in step S502), the processing ends. The case where the authentication information is stored means that authentication has been successfully performed in the manual authentication processing in step S501 and the MFP 101 has logged in to the education management server 104.

In step S503, the CPU 111 performs file location identification processing to be described below with reference to FIG. 8. In the file location identification processing, the CPU 111 refers to the data management server 105 associated with the education management server 104, based on the education management server 104 to which the MFP 101 has logged in, and acquires, for assignment data selected by the user, a file path where the assignment data selected by the user is to be stored in the data management server 105. The file path where the assignment data is to be stored will be hereinafter referred to as the file location information (storage location information).

In step S504, the CPU 111 determines whether the file location information is stored in the RAM 113. In a case where the file location information is stored (YES in step S504), the processing proceeds to step S505, and in a case where the file location information is not stored (NO in step S504), the processing proceeds to step S509. The case where the file location information is stored means that the file location information has been successfully acquired in the file location identification processing in step S503.

In step S505, the CPU 111 acquires the file location information stored in the RAM 113.

Using the acquired file location information, the CPU 111 acquires the assignment data selected by the user in the file location identification processing in step S503 via the education management server 104, and stores the acquired assignment data into the RAM 113.

In step S506, the CPU 111 determines whether the assignment data is present in the RAM 113 (i.e., whether the acquisition in step S505 is successful). In a case where the assignment data is present (YES in step S506), the processing proceeds to step S507, and in a case where the assignment data is not present (NO in step S506), the processing proceeds to step S510.

In step S507, the CPU 111 reads out he authentication information for logging in to the education management server 104, the file location information, and the IP address of the education management server from the RAM 113, encodes the read information into one Quick Response (QR) code®, and generates a combined image in which the QR code is arranged at a predetermined position in the assignment image. The image generated here will be hereinafter referred to as an embedded image. The embedded image is stored into the RAM 113. The QR code in the embedded image is analyzed by scan data analysis processing (in step S604 to be described below) in the assignment submission processing to be described with reference to FIG. 6, so that the original authentication information, file location information, and IP address of the education management server are each read out. Here, the QR code is described as an example of code information, but another code may be embedded in image data. In that case, there may be adopted a configuration in which the authentication information for the education management server, the file location information, and the IP address of the education management server are encoded by a method other than the QR code, or the authentication information for the education management server, the file location information, and the IP address of the education management server are independently encoded, and the encoded information is then combined with the image.

Furthermore, although not described in the present disclosure, a configuration may be adopted in which a position where information is arranged is not fixed and a user designates an arrangement position after previewing an assignment image. The embedded image corresponds to an embedded image 1800 illustrated in FIG. 18. A display 1801 indicates the QR code into which the authentication information for the education management server, the file location information, and the IP address of the education management server described above have been encoded, and the QR code has been combined with the assignment image in step S507. A display 1802 indicates the title of the assignment, displays 1803 indicate questions, and displays 1804 indicate answer input fields.

In step S508, the CPU 111 reads out the embedded image stored in the RAM 113 and prints the embedded image using the print unit 120.

In step S509, the CPU 111 releases the authentication state held with the education management server.

Figure 14:
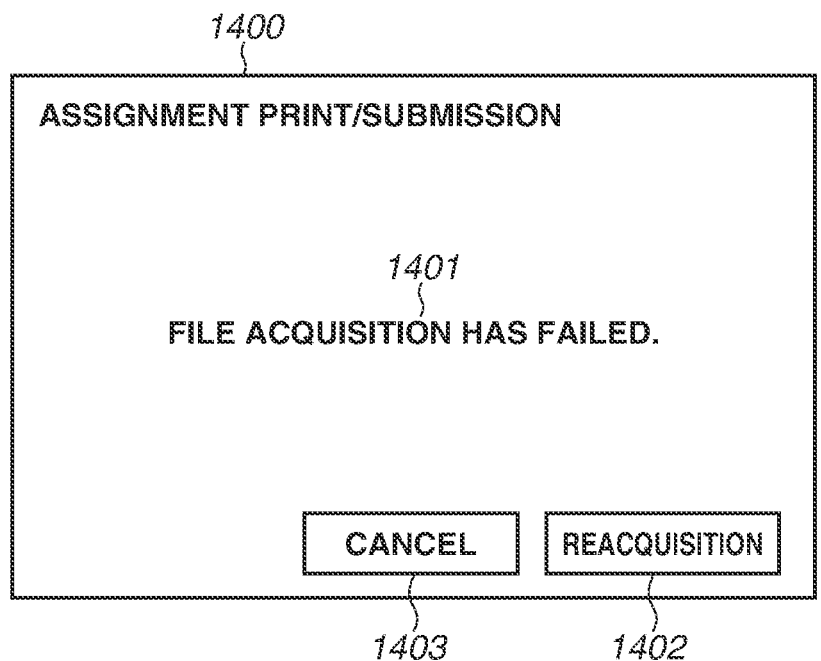
FIG. 14 is a diagram illustrating an example of a screen to be displayed when acquisition of an assignment image has failed according to the first exemplary embodiment.

In step S510, the CPU 111 displays a screen 1400 (FIG. 14) indicating that the acquisition of the assignment image has failed, on the operation unit 116. A display 1401 in FIG. 14 indicates that the acquisition of the assignment image has failed.

In step S511, the CPU 111 determines whether a reacquisition button 1402 for reacquiring the assignment image in the screen 1400 displayed on the operation unit 116 is selected. In a case where the CPU 111 determines that the reacquisition button 1402 is selected (YES in step S511), the processing returns to step S505, and in a case where the CPU 111 determines that the reacquisition button 1402 is not selected (NO in step S511), the processing proceeds to step S512. In the present flowchart, only the options of reacquisition of the assignment image in step S511 and cancellation in step S512 are provided in a case where the acquisition of the assignment image fails in step S506. However, an option of returning to step S503 to reacquire the file location information may be provided.

In step S512, the CPU 111 determines whether a cancel button 1403 in the screen 1400 displayed on the operation unit 116 is selected. In a case where the CPU 111 determines that the cancel button 1403 is selected (YES in step S512), the processing proceeds to step S509, and in a case where the CPU 111 determines that the cancel button 1403 is not selected (NO in step S512), the processing returns to step S510 to display the screen 1400.

Figure 6:
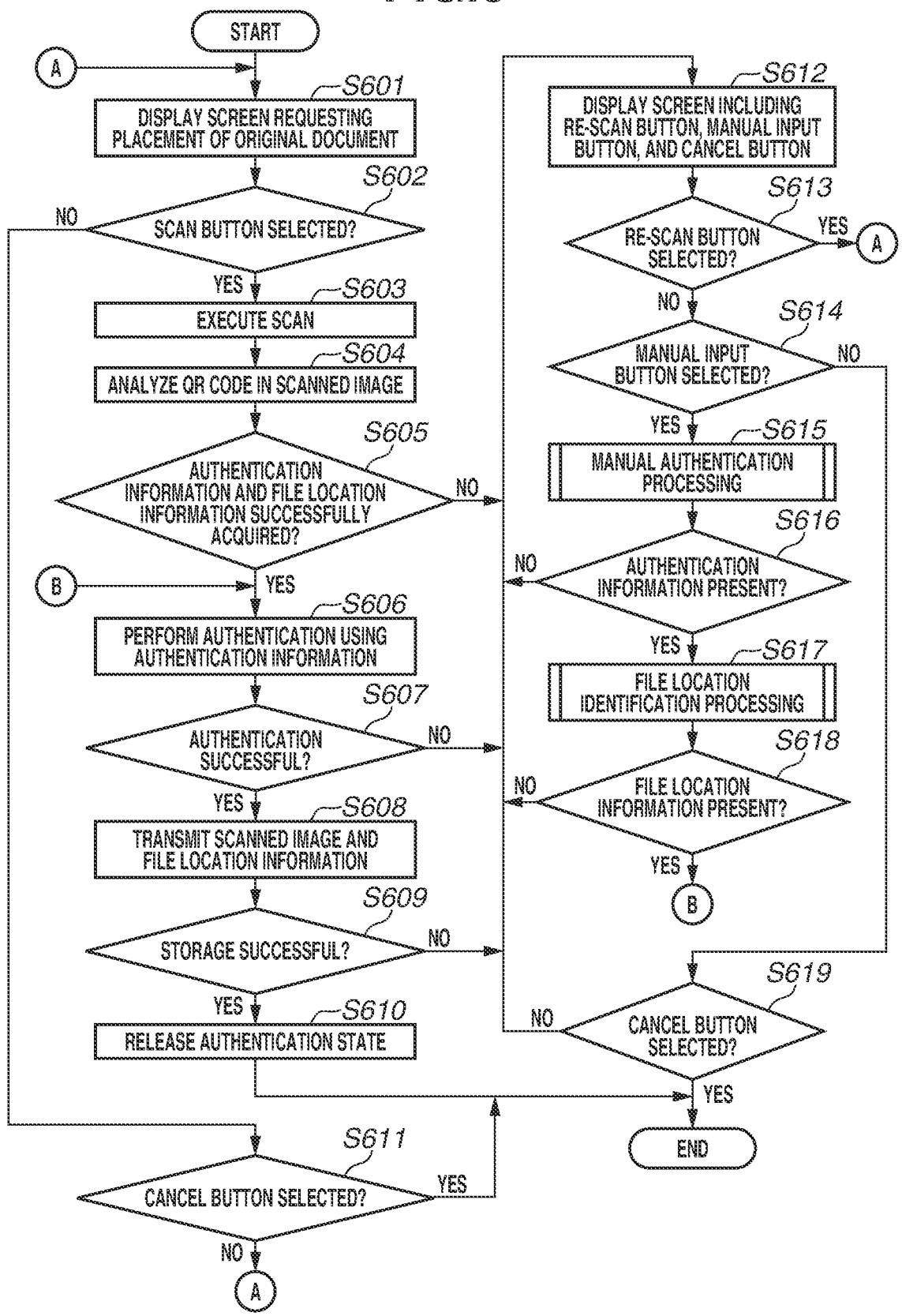
FIG. 6 is a flowchart illustrating assignment submission processing according to the first exemplary embodiment.

FIG. 6 is a flowchart illustrating the assignment submission processing in the present system. The CPU 111 reads out a program stored in the ROM 112 or the storage 114 into the RAM 113, and executes the program, so that each step of the flowchart in FIG. 6 is implemented.

Figure 15:
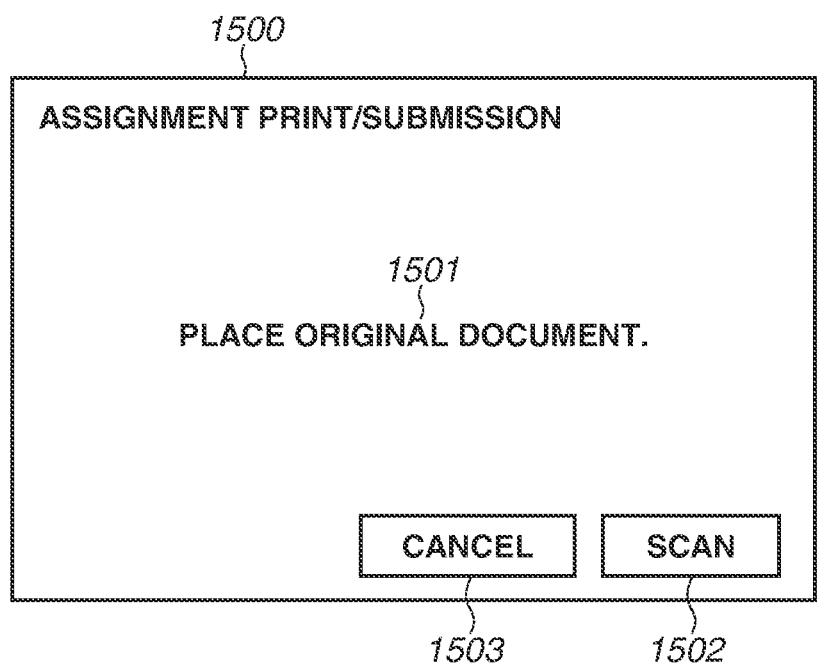
FIG. 15 is a diagram illustrating an example of a screen for requesting placement of an original document according to the first exemplary embodiment.
Figure 18:
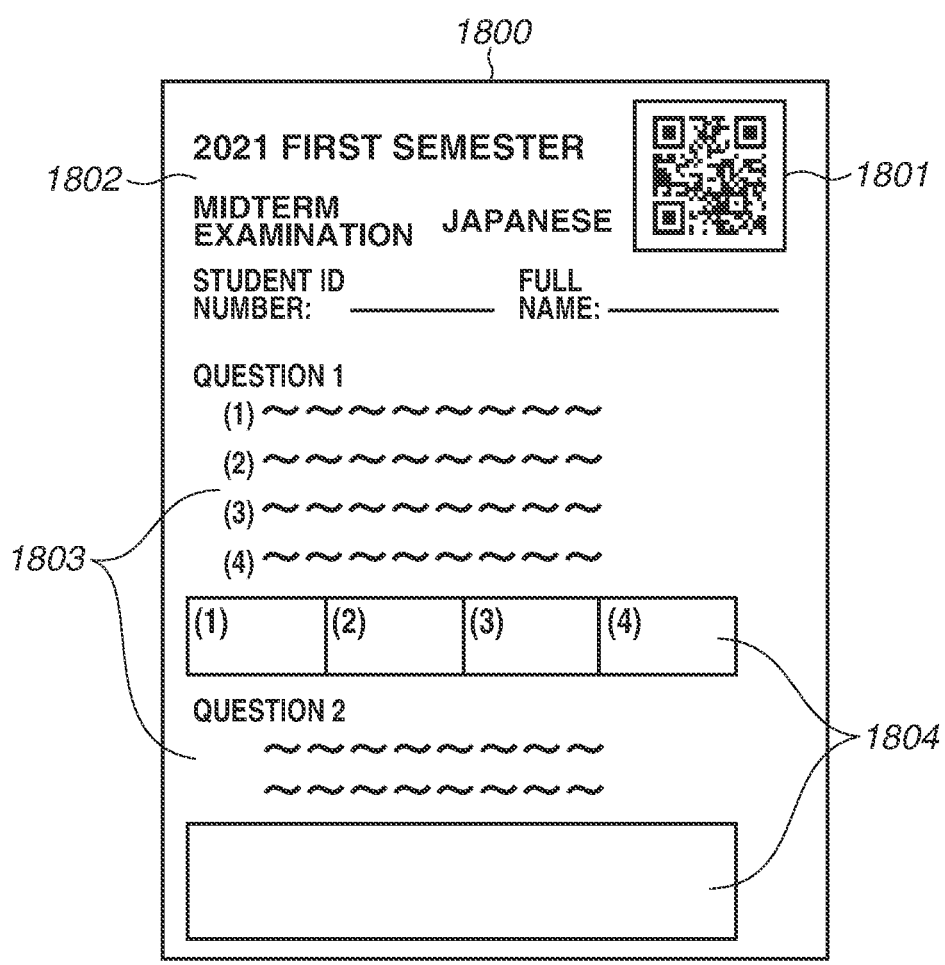
FIG. 18 is a diagram illustrating an example of an image in which a Quick Response (QR) code® is embedded in an assignment image according to the first exemplary embodiment.

In step S601, the CPU 111 displays a screen 1500 including a display 1501 requesting placement of an original document as illustrated in FIG. 15, on the operation unit 116. The original document to be placed here is a sheet on which the embedded image 1800 in FIG. 18 is printed and the user has been completed addition of some writing in the answer input fields 1804.

In step S602, the CPU 111 determines whether a scan button 1502 in the screen 1500 requesting placement of the original document displayed on the operation unit 116 is selected. In a case where the CPU 111 determines that the scan button 1502 is selected (YES in step S602), the processing proceeds to step S603, and in a case where the CPU 111 determines that the scan button 1502 is not selected (NO in step S602), the processing proceeds to step S611. The scan button 1502 is a button for executing scan of the original document using the reading unit 118.

In step S603, the CPU 111 reads the original document using the reading unit 118, and stores a scanned image generated thereby into the RAM 113.

In step S604, the CPU 111 analyzes the QR code in the scanned image acquired in step S603, acquires the authentication information for the education management server 104, the file location information, and the IP address of the education management server, and stores the acquired information into the RAM 113. As described above with reference to step S507 of the assignment print processing in FIG. 5, the case where the QR code is arranged at the predetermined position of the original document is described in the present disclosure. In a case where the QR code is not arranged at the predetermined position, there may be adopted a method such as performing analysis of the QR code after a position of the QR code is designated by the user from a preview screen for preview of the scanned image displayed on the operation unit 116. Further, in a case where there is adopted a configuration of encoding the authentication information for the education management server 104, the file location information, and the IP address of the education management server in a method other than the QR code in step S507, an analysis method corresponding to the encoding scheme may be performed in step S604.

In step S605, the CPU 111 determines whether each of the authentication information for the education management server 104, the file location information, and the IP address of the education management server is stored in the RAM 113. In a case where the CPU 111 determines that the information is stored (YES in step S605), the processing proceeds to step S606, and in a case where the CPU 111 determines that the information is not stored (NO in step S605), the processing proceeds to step S612.

In step S606, the CPU 111 reads out the authentication information for the education management server 104 and the IP address of the education management server 104 stored in the RAM 113, and performs authentication for the education management server 104. Specifically, the CPU 111 transmits the authentication information to the education management server 104, and receives response information from the education management server 104.

In step S607, the CPU 111 determines whether the response information is received from the education management server 104 in step S606, and the authentication is successful. In a case where the CPU 111 determines that the authentication is successful (YES in step S607), the processing proceeds to step S608, and in a case where the CPU 111 determines that the authentication is not successful (NO in step S607), the processing proceeds to step S612. Receiving the response information from the education management server 104 means completion of the authentication for the education management server 104.

In step S608, the CPU 111 reads out each of the scanned image acquired in step S603, and the file location information and the IP address of the education management server 104 acquired in step S604, from the RAM 113. Subsequently, the CPU 111 transmits, in addition to the scanned image and the file location information read out here, information about a command to store the image data into the data management server 105, to the education management server 104. The education management server 104 analyzes the foregoing information about the command to store the image data and the file location information that have been received, and stores the received image data to the path designated by the file location information in the data management server 105. In the present exemplary embodiment, the file name of the image data to be stored is a character string generated by adding a specific character string such as a date and time to the file name of the original assignment image data, but the present exemplary embodiment is not limited thereto and any other method can be used as long as a file name can be determined thereby. In a case where the storage of the image data is completed, the education management server 104 transmits information indicating the completion of the storage to the MFP 101.

In step S609, the CPU 111 determines whether the information indicating the completion of the storage described in step S608 is received from the education management server 104. In a case where the CPU 111 determines that the information is received (YES in step S609), the processing proceeds to step S610, and in a case where the CPU 111 determines that the information is not received (NO in step S609), the processing proceeds to step S612. Receiving the information indicating the completion of the storage means that the storage of the transmitted image data into the data management server 105 is completed in step S608.

In step S610, the CPU 111 releases the authentication state held with the education management server 104.

In step S611, the CPU 111 determines whether a cancel button 1503 of the screen 1500 displayed on the operation unit 116 is selected. In a case where the CPU 111 determines that the cancel button 1503 is selected (YES in step S611), the processing ends, and in a case where the CPU 111 determines that the cancel button 1503 is selected (NO in step S611), the processing returns to step S601.

Figure 16:
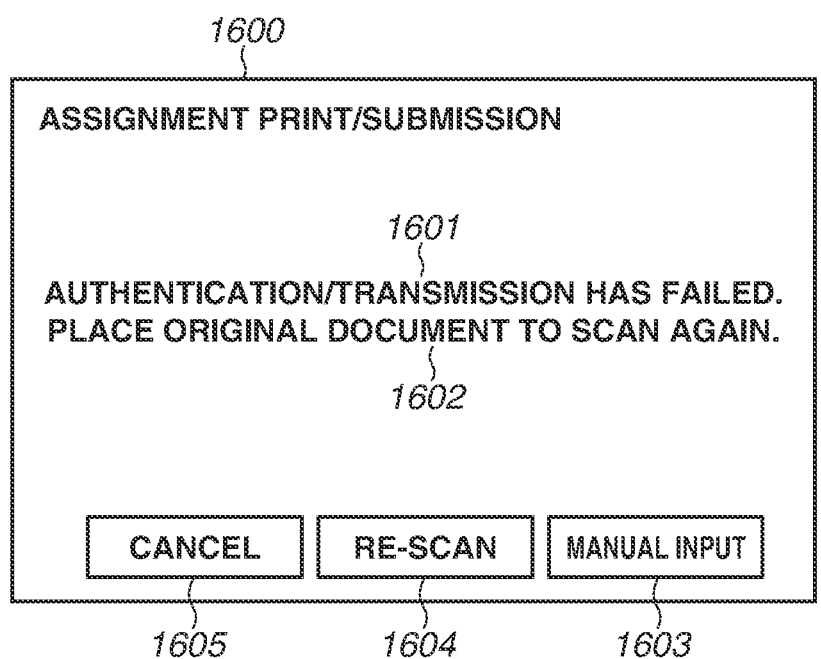
FIG. 16 is a diagram illustrating an example of a screen to be displayed when authentication/transmission has failed according to the first exemplary embodiment.

In step S612, the CPU 111 displays an authentication/transmission failure screen 1600 illustrated in FIG. 16, on the operation unit 116. A display 1601 of the authentication/transmission failure screen 1600 illustrated in FIG. 16 indicates that the authentication or transmission has failed.

In step S613, the CPU 111 determines whether a re-scan button 1604 in FIG. 16 displayed on the operation unit 116 is selected. In a case where the CPU 111 determines that the re-scan button 1604 is selected (YES in step S613), the processing returns to step S601, and in a case where the CPU 111 determines that the re-scan button 1604 is not selected (NO in step S613), the processing proceeds to step S614. A display 1602 in FIG. 16 indicates that it is necessary to place the original document beforehand, in a case where the user selects the re-scan button 1604 in step S613.

In step S614, the CPU 111 determines whether a manual input button 1603 in FIG. 16 displayed on the operation unit 116 is selected. In a case where the CPU 111 determines that the manual input button 1603 is selected (YES in step S614), the processing proceeds to step S615, and in a case where the CPU 111 determines that the manual input button 1603 is not selected (NO in step S614), the processing proceeds to step S619. In a case where the manual input button 1603 is selected, the CPU 111 performs acquisition of the authentication information in the manual authentication processing in step S615 and acquisition of the file location information in the file location identification processing in step S617.

In step S615, the CPU 111 performs the manual authentication processing to be described below with reference to FIG. 7. In the present flowchart, basically, the input of the authentication information by the user can be omitted by performing authentication based on the result of analyzing the QR code in the scanned image in step S604, at the time of submitting the assignment. However, the manual input button 1603 is prepared for a case where the acquisition of the authentication information or the file location information fails in step S605, the time when the authentication fails in step S607, and a case where the storage of the scanned image into the data management server 105 fails in step S609. In particular, in a case where there is noise in the QR code portion of the original document, or in a case where an original document of an assignment image created in processing other than the assignment print processing is to be transmitted, it is possible to transmit the assignment without performing the scan again by selecting the manual input button 1603. Therefore, although not included in the present exemplary embodiment, there may be adopted a configuration in which the manual input button 1603 in FIG. 16 is included in the screen 1500 in FIG. 15 displayed in step S601, and the manual authentication processing and the file location identification processing are performed at the time of the submission of the assignment.

In step S616, the CPU 111 determines whether the authentication information is stored in the RAM 113. In a case where the CPU 111 determines that the authentication information is stored (YES in step S616), the processing proceeds to step S617, and in a case where the CPU 111 determines that the authentication information is not stored (NO in step S616), the processing returns to step S612.

In step S617, the CPU 111 performs the file location identification processing.

In step S618, the CPU 111 determines whether the file location information is stored in the RAM 113. In a case where the CPU 111 determines that the file location information is stored (YES in step S618), the processing returns to step S606, and in a case where the CPU 111 determines that the file location information is not stored (NO in step S618), the processing returns to step S612.

In step S619, the CPU 111 determines whether a cancel button 1605 in FIG. 16 displayed on the operation unit 116 is selected. In a case where the CPU 111 determines that the cancel button 1605 is selected (YES in step S619), the processing ends, and in a case where the CPU 111 determines that the cancel button 1605 is not selected (NO in step S619), the processing returns to step S612.

Figure 7:
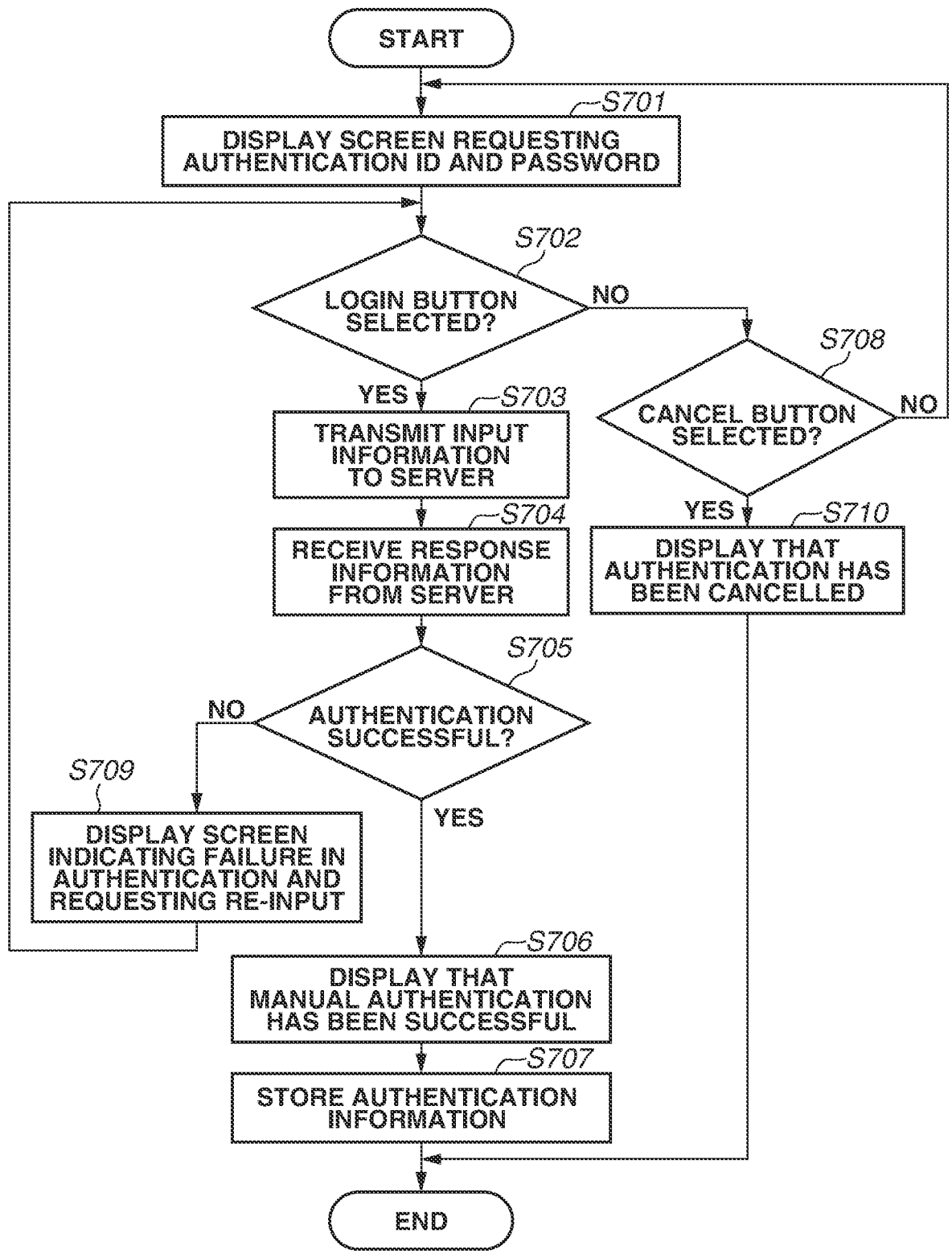
FIG. 7 is a flowchart illustrating manual authentication processing according to the first exemplary embodiment.

FIG. 7 is a flowchart illustrating the manual authentication processing in the present system. The CPU 111 reads out a program stored in the ROM 112 or the storage 114 into the RAM 113, and executes the program, so that each step of the flowchart in FIG. 7 is implemented.

Figure 12:
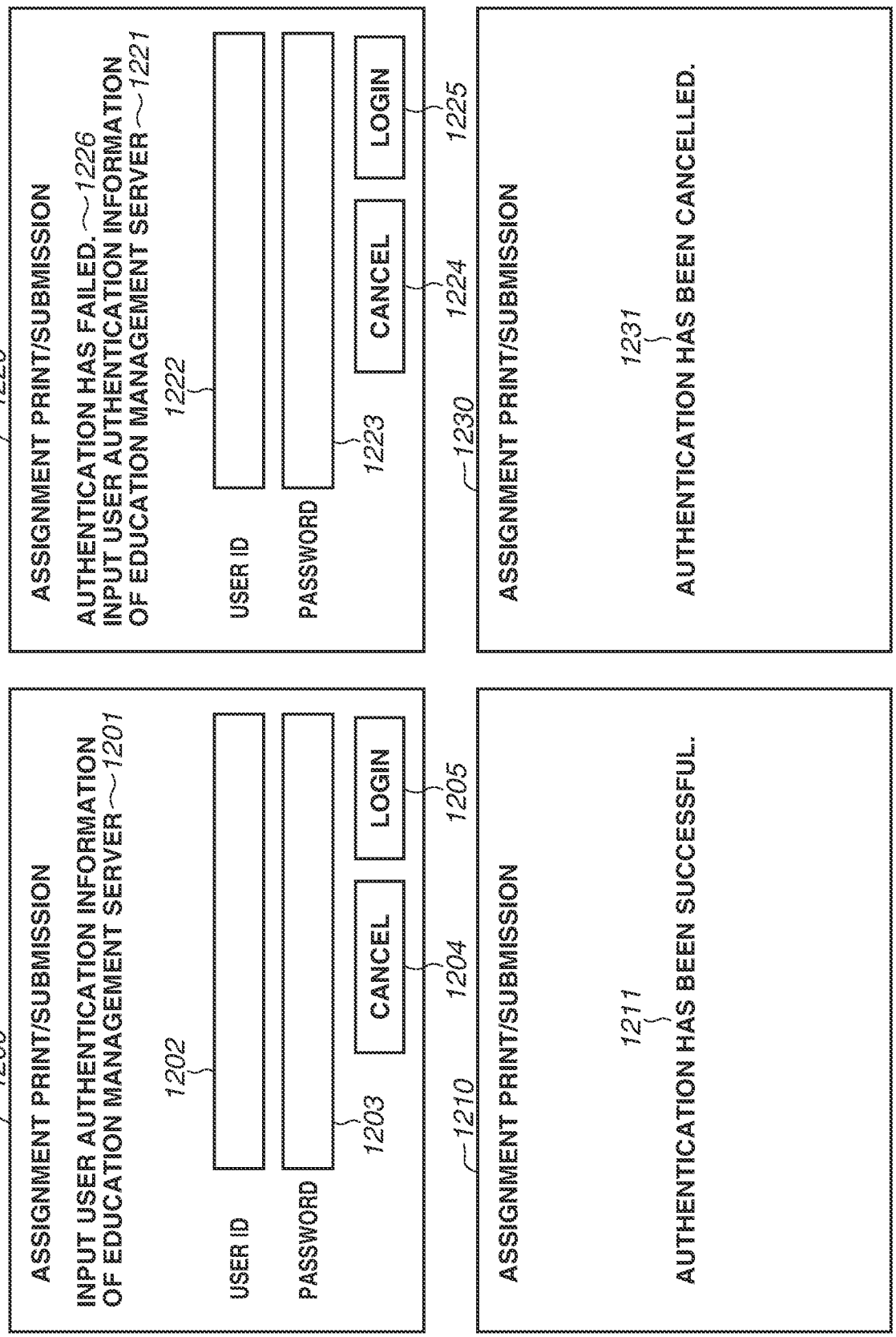
FIG. 12 is a diagram illustrating examples of a screen related to the manual authentication processing according to the first exemplary embodiment.

In step S701, the CPU 111 displays a manual authentication screen 1200 illustrated in FIG. 12, on the operation unit 116. A display 1201 in the manual authentication screen 1200 indicates a request to the user to input information in a user ID input field 1202 and a password input field 1203.

In step S702, the CPU 111 determines whether a login button 1205 in the manual authentication screen 1200 displayed on the operation unit 116 is selected. In a case where the CPU 111 determines that the login button 1205 is selected (YES in step S702), the processing proceeds to step S703, and in a case where the CPU 111 determines that the login button 1205 is not selected (NO in step S702), the processing proceeds to step S708.

In step S703, the CPU 111 acquires the authentication information input in the user ID input field 1202 and the password input field 1203, and transmits the acquired authentication information to the education management server 104.

In step S704, the CPU 111 receives response information from the education management server 104.

In step S705, the CPU 111 determines whether the response information received in step S704 indicates that the authentication is successful. In a case where the CPU 111 determines that the response information indicates that the authentication is successful (YES in step S705), the processing proceeds to step S706, and in a case where the CPU 111 determines that the response information does not indicate that the authentication is successful (NO in step S705), the processing proceeds to step S709.

In step S706, the CPU 111 displays a manual authentication success screen 1210 illustrated in FIG. 12, on the operation unit 116. A display 1211 in the manual authentication success screen 1210 indicates that the authentication has been successful.

In step S707, the CPU 111 stores the authentication information acquired in step S703 into the RAM 113.

In step S708, the CPU 111 determines whether a cancel button 1204 in the manual authentication screen 1200 in FIG. 12 displayed on the operation unit 116 is selected. In a case where the CPU 111 determines that the cancel button 1204 is selected (YES in step S708), the processing proceeds to step S710, and in a case where the CPU 111 determines that the cancel button 1204 is not selected (NO in step S708), the processing returns to step S701.

In step S709, the CPU 111 displays a screen 1220 illustrated in FIG. 12, on the operation unit 116. Description of displays 1221 to 1225 in the screen 1220 is common to the description of the displays 1201 to 1205 in the screen 1200, and thus will be omitted. A display 1226 indicates that the authentication has failed.

In step S710, the CPU 111 displays an authentication cancellation screen 1230 in FIG. 12, on the operation unit 116. A display 1231 in the authentication cancellation screen 1230 indicates that the authentication has been cancelled.

Figure 8:
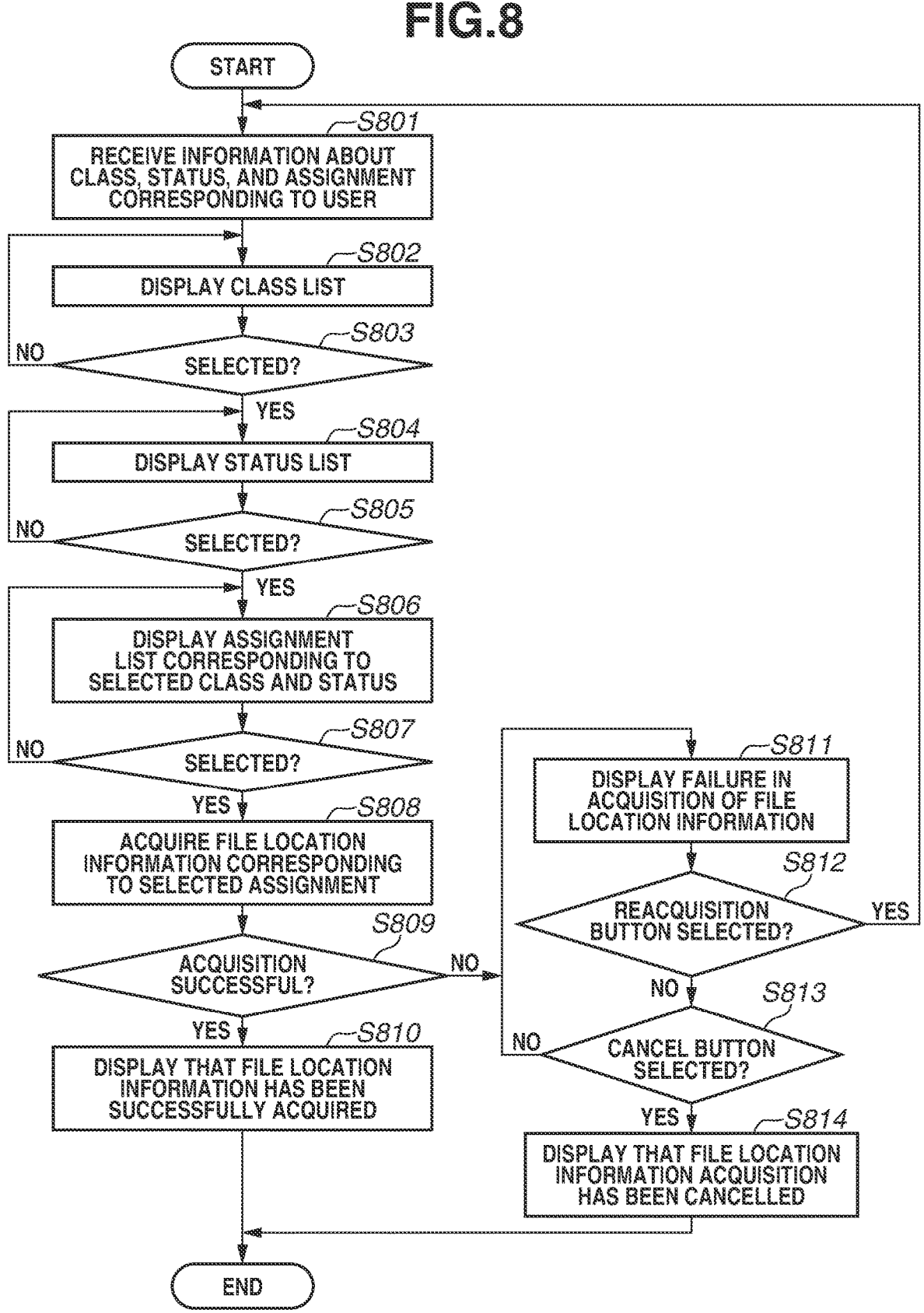
FIG. 8 is a flowchart illustrating file location identification processing according to the first exemplary embodiment.

FIG. 8 is a flowchart illustrating the file location identification processing in the present system.

The CPU 111 reads out a program stored in the ROM 112 or the storage 114 into the RAM 113, and executes the program, so that each step of the flowchart in FIG. 8 is implemented.

In step S801, the CPU 111 receives assignment information (class list information, status list information, and assignment list information) related to the logged-in user, from the education management server 104 being in the authentication state, and stores the received assignment information into the RAM 113.

In step S802, the CPU 111 reads out the class list information included in the assignment information from the RAM 113, and displays a class list screen 1300 in FIG. 13 generated based on the content read out, on the operation unit 116. The class list screen 1300 displays a class list 1303 related to an ID 1301 of the logged-in user, and a display 1302 indicates a request to select a class from the class list 1303. In a case where a class is selected in step S802, the CPU 111 stores the information about the selected class into the RAM 113.

In step S803, the CPU 111 determines whether a class is selected from the class list 1303 in the class list screen 1300 displayed on the operation unit 116. Specifically, the CPU 111 determines whether the information about the class is present in the RAM 113. In a case where the CPU 111 determines that the information about the class is present (YES in step S803), the processing proceeds to step S804, and in a case where the CPU 111 determines that the information about the class is not present (NO in step S803), the processing returns to step S802.

In step S804, the CPU 111 reads out the status list information included in the assignment information from the RAM 113, and displays a status list screen 1310 in FIG. 13 based on the content read out, on the operation unit 116. The status list screen 1310 displays a status list 1313 related to the ID 1311 of the logged-in user, and a display 1312 indicates a request to select a status from the status list 1313. In a case where a status is selected in step S804, the CPU 111 stores the information about the status into the RAM 113.

In step S805, the CPU 111 determines whether a status is selected from the status list 1313 in the status list screen 1310 displayed on the operation unit 116. Specifically, the CPU 111 determines whether the information about the status is present in the RAM 113. In a case where the CPU 111 determines that the information of the status is present (YES in step S805), the processing proceeds to step S806, and in a case where the CPU 111 determines that the information of the status is not present (NO in step S805), the processing returns to step S804.

In step S806, the CPU 111 acquires, in addition to the information about the class stored in step S802 and the information about the status stored in step S804, the assignment list information included in the assignment information stored in step S801, from the RAM 113. Each assignment included in the assignment list information holds a class attribute and a status attribute. The CPU 111 creates an assignment list screen 1320 in FIG. 13 by extracting only assignments each holding attributes matching with the information about the class and the information about the status from the assignment list information, and displays the assignment list screen 1320 on the operation unit 116. The assignment list screen 1320 displays an assignment list 1323 related to an ID 1321 of the logged-in user, information 1324 about the class, and information 1325 about the status.

A display 1322 indicates a request to select an assignment from the assignment list 1323. In a case where an assignment is selected in step S806, the CPU 111 stores the information about the selected assignment into the RAM 113.

In step S807, the CPU 111 determines whether an assignment is selected from the assignment list 1323. In a case where the CPU 111 determines that an assignment is selected (YES in step S807), the processing proceeds to step S808, and in a case where the CPU 111 determines that an assignment is not selected (NO in step S807), the processing returns to step S806.

In step S808, the CPU 111 acquires the file location information corresponding to the assignment selected in step S806 by inquiring of the education management server 104, and stores the acquired file location information into the RAM 113.

In step S809, the CPU 111 determines whether the acquisition of the file location information in step S808 is successful. Specifically, the CPU 111 determines whether the file location information is stored in the RAM 113. In a case where the CPU 111 determines that the file location information is stored (YES in step S809), the processing proceeds to step S810, and in a case where the CPU 111 determines that the file location information is not stored (NO in step S809), the processing proceeds to step S811.

Figure 17:
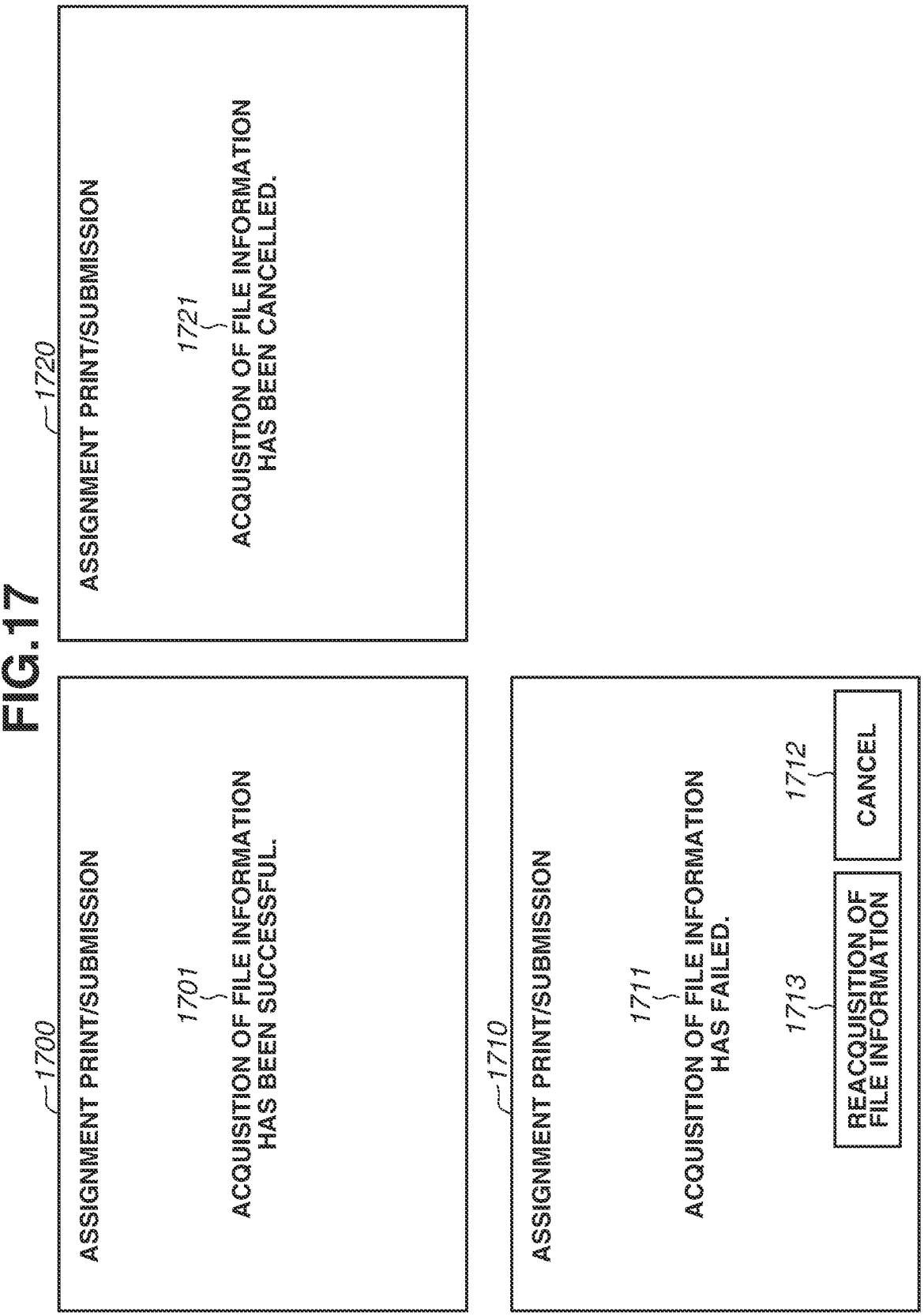
FIG. 17 is a diagram illustrating examples of a screen that displays a result of the file location identification processing according to the first exemplary embodiment.

In step S810, the CPU 111 displays a file location information acquisition success screen 1700 illustrated in FIG. 17, on the operation unit 116. A display 1701 in the file location information acquisition success screen 1700 indicates that the acquisition of the file location information has been successful.

In step S811, the CPU 111 displays a file location information acquisition failure screen 1710 illustrated in FIG. 17, on the operation unit 116. A display 1711 of the file location information acquisition failure screen 1710 indicates that the acquisition of the file location information has failed. The file location information acquisition failure screen 1710 also includes a reacquisition button 1713 for reacquiring the file location information and a cancel button 1712.

In step S812, the CPU 111 determines whether the reacquisition button 1713 for reacquiring the file location information in the screen 1710 displayed on the operation unit 116 is selected. In a case where the CPU 111 determines that the reacquisition button 1713 is selected (YES in step S812), the processing returns to step S801, and in a case where the CPU 111 determines that the reacquisition button 1713 is not selected (NO in step S812), the processing proceeds to step S813.

In step S813, the CPU 111 determines whether the cancel button 1712 in the screen 1710 displayed on the operation unit 116 is selected. In a case where the CPU 111 determines that the cancel button 1712 is selected (YES in step S813), the processing proceeds to step S814, and in a case where the CPU 111 determines that the cancel button 1712 is not selected (NO in step S813), the processing returns to step S811.

In step S814, the CPU 111 displays a file location information acquisition cancellation screen 1720 illustrated in FIG. 17, on the operation unit 116. A display 1721 in the file location information acquisition cancellation screen 1720 indicates that the acquisition of the file location information has been cancelled.

Performing the above-described control makes it possible to omit input of necessary authentication information in transmitting image data of an original document to an external apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-041324, filed Mar. 16, 2022, which is hereby incorporated by reference herein in its entirety.

What is claimed is:

1. An image processing apparatus comprising:
   a reader that reads document to generate image data;
   a memory storing instructions; and
   a processor that, by executing the stored instructions, is configured to:
      analyze code information in the generated image data;
      acquire authentication information and storage location information by analyzing the code information, the authentication information being for logging in to an external apparatus, and the storage location information indicating a storage location for storing image data;
      log in to the external apparatus using the acquired authentication information; and
      transmit the generated image data to the external apparatus that the image processing apparatus has logged into to store the generated image in the storage location indicated by the storage location information.

2. The image processing apparatus according to claim 1, wherein execution of the stored instructions further configures the processor to transmit, upon logging in to the external apparatus, the storage location information and the generated image data to the external apparatus to store the generated image data in the storage location indicated by the storage location information.

3. The image processing apparatus according to claim 1, wherein execution of the stored instructions further configures the processor:
   receive another image data and the storage location information from the external apparatus;
   generate the code information based on at least the received storage location information; and
   print an image based on the received another image data and the generated code information.

4. The image processing apparatus according to claim 3, wherein execution of the stored instructions further configures the processor to:
   generate the code information based on authentication information accepted from a user, and the received storage location information, and
   print an image based on the received another image data and the generated code information.

5. The image processing apparatus according to claim 1, wherein the storage location information indicates a storage location in another external apparatus different from the external apparatus.

6. The image processing apparatus according to claim 1, wherein the storage location information is a file path.

7. The image processing apparatus according to claim 1, wherein execution of the stored instructions further configures the processor to:
   present a screen for accepting other authentication information from a user when logging in to the external apparatus using the acquired authentication information fails; and
   log in to the external apparatus using the other authentication information.

8. The image processing apparatus according to claim 1, further comprising a user interface that designates an Internet Protocol (IP) address of the external apparatus.

9. A control method for an image processing apparatus, the control method comprising:
   reading a document;
   analyzing code information in image data generated by reading of the document;
   acquiring authentication information and storage location information by analyzing the code information, the authentication information being for logging in to an external apparatus, and the storage location information indicating a storage location for storing image data;
   logging in to the external apparatus using the acquired authentication information; and
   transmitting the generated image data to the external apparatus that the image processing apparatus has logged into to store the generated image data in the storage location indicated by the storage location information.

10. A non-transitory computer-readable storage medium storing instructions that, when executed by at least one processor, executes a control method for controlling an image processing apparatus, the control method comprising:
   analyzing code information in image data generated by reading a document;
   acquiring authentication information and storage location information by analyzing the code information, the authentication information being for logging in to an external apparatus, and the storage location information indicating a storage location for storing image data;
   logging in to the external apparatus using the acquired authentication information; and
   transmitting the generated image data to the external apparatus that the image processing apparatus has logged into to store the generated image data in the storage location indicated by the storage location information.

* * * * *